US006776448B2

(12) United States Patent
Matsui et al.

(10) Patent No.: US 6,776,448 B2
(45) Date of Patent: Aug. 17, 2004

(54) VEHICLE DOOR APPARATUS

(75) Inventors: Seika Matsui, Chiryu (JP); Mizuho Morimitsu, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/442,113

(22) Filed: May 21, 2003

(65) Prior Publication Data

US 2004/0020126 A1 Feb. 5, 2004

(30) Foreign Application Priority Data

May 21, 2002 (JP) ........................................ 2002-146852

(51) Int. Cl.[7] ........................................ B60J 5/00
(52) U.S. Cl. ........................................ 296/146.4; 296/56
(58) Field of Search ........................................ 296/146.4, 146.8, 296/56; 49/341

(56) References Cited

U.S. PATENT DOCUMENTS 5,263,762 A * 11/1993 Long et al. .............. 296/146.4
5,851,050 A * 12/1998 Squire et al. ............ 296/146.4
5,896,703 A * 4/1999 Wright et al. ................. 296/56
6,055,775 A * 5/2000 Dering et al. ................. 296/56
6,270,147 B1 * 8/2001 Butler et al. ............. 296/146.4
6,478,357 B2 * 11/2002 Zhou ........................... 296/56
6,520,548 B1 * 2/2003 Fisher et al. .................. 49/280
2003/0140565 A1 * 7/2003 Otomo et al. ................. 49/360
2003/0146644 A1 * 8/2003 Sakai et al. .............. 296/146.8
2003/0182863 A1 * 10/2003 Mejean et al. ................. 49/26
2003/0218357 A1 * 11/2003 Mitsui et al. ............ 296/146.8
2004/0046418 A1 * 3/2004 Chikata et al. .......... 296/146.4

FOREIGN PATENT DOCUMENTS

JP 5-27748 B2 4/1993
JP 411236783 A * 8/1999

* cited by examiner

*Primary Examiner*—Jason Morrow
(74) *Attorney, Agent, or Firm*—Burns, Doane, Swecker & Mathis, L.L.P.

(57) ABSTRACT

A vehicle door apparatus includes a drive mechanism and a closure mechanism including a striker and a latch. The striker is positioned within a region where the striker is engageable with the latch when the drive mechanism drives the door in a closing direction. The latch is driven to engage with the striker and shifted to a final locked position by the closure mechanism. The vehicle door apparatus also includes a control mechanism for controlling operations of the drive mechanism and the closure mechanism, a detection mechanism for detecting the striker to be positioned within the region where the striker is engageable with the latch, and a drive force decreasing mechanism provided in the control mechanism for decreasing an output of the drive mechanism after the detecting mechanism detects that the strikes is positioned within the region where the striker is engageable with the latch.

14 Claims, 10 Drawing Sheets

VEHICLE DOOR APPARATUS

This application is based on and claims priority under 35 U.S.C. §119 with respect to Japanese Application No. 2002-146852 filed on May 21, 2002.

FIELD OF THE INVENTION

This invention generally relates to a vehicle door apparatus.

BACKGROUND OF THE INVENTION

A known vehicle door apparatus for opening and closing a vehicle door includes a drive mechanism for driving the door from an open state to a closed state, and a closure mechanism including a striker provided at the vehicle body and a latch provided at the door for engaging with the striker so as to lock the door. The closure mechanism drives the latch to engage with the striker being positioned within a region where the striker is engageable with the latch when the drive mechanism drives the door in a closing direction, and shifts the latch to a final locked position. The vehicle door apparatus also includes a control mechanism for controlling operations of the drive mechanism and the closure mechanism in accordance with a door closing command. Further, the vehicle door apparatus includes a switch that is turned on when it is detected that the striker is positioned within the region where the striker is engageable with the latch. The control mechanism of the door apparatus deactivates the drive mechanism when the switch is turned on and at the same time activates the closure mechanism.

A control method according to the above-mentioned control mechanism is shown in FIG. 9A. The drive mechanism is operated to produce the output in accordance with the door closing command. The door is then moved in a closing direction. When the door is closed to a point where the striker is positioned within the region where the striker is engageable with the latch (hereinafter referred to as "temporary closed state") and thus the switch is turned on, the drive mechanism is stopped to operate and the closure mechanism is activated as shown above.

The door and the vehicle body where the door is attached may have the respective distortion. In a final stage of the door closing operation, a reaction force against the door closing direction is generated when the door and a portion of the vehicle body to be attached to the door become in contact with each other, due to the respective distortion of the door and the vehicle body. In addition, a seal member provided between the door and the corresponding vehicle body portion may generate the reaction force due to a compression of the seal member. Thus, when the door is closed by the drive mechanism and placed in the temporary closed state, the above-mentioned each reaction force may affect the door to return in an opening direction. When the reaction force is large, the door may return in the opening direction immediately after the door is placed in the temporary closed state.

According to the known vehicle door apparatus mentioned above, the drive mechanism is stopped to operate when the door becomes in the temporary closed state. The temporary closed state may be thus cancelled as the door returns in the opening direction before the door is placed in the final locked position by the closure mechanism. As a result, the switch is turned off and therefore an additional cycle such as repeating the operation of the drive mechanism is required for obtaining the temporary closed state (shown in FIG. 9B). An extra time is required to completely close the door and therefore, the door closing efficiency requires to be improved.

In order to solve the above-mentioned problem, as shown in FIG. 10, it is considered to delay the drive mechanism to stop so that the door is moved in the closing direction by the output of the drive mechanism until the closure mechanism is ready to operate. In this case, however, the door may suffer another distortion and further, a clutch, a motor and a drive circuit of the drive mechanism may receive the harmful effect. Precisely, abnormal noise or heat is produced since the clutch may slip widely and the abrasion of the clutch is increased. In addition, the heating value of the motor or the drive circuit is increased and thus the durability of the door apparatus may be decreased.

In light of the foregoing, a need exists for a vehicle door apparatus which addresses at least the foregoing drawback associated with other known vehicle door apparatus.

Thus, a need exists for a vehicle door apparatus which can perform a smooth door closing operation without applying an inappropriate force to the door.

SUMMARY OF THE INVENTION

According to an aspect of the present invention, a vehicle door apparatus includes a drive mechanism for driving the door from an open state to a closed state, and a closure mechanism including a striker provided at the vehicle body and a latch provided at the door for engaging with the striker so as to lock the door. The striker is positioned within a region where the striker is engageable with the latch when the drive mechanism drives the door in a closing direction. The latch is driven to engage with the striker and shifted to a final locked position by the closure mechanism. In addition, the vehicle door apparatus includes a control mechanism for controlling operations of the drive mechanism and the closure mechanism based on a door closing command, a detection means for detecting the striker to be positioned within the region where the striker is engageable with the latch and a drive force decreasing mechanism provided in the control mechanism for decreasing an output of the drive mechanism after the detecting means detects that the strikes is positioned within the region where the striker is engageable with the latch.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

The first and second embodiments of the present invention are explained referring to attached drawings.

Figure 1:
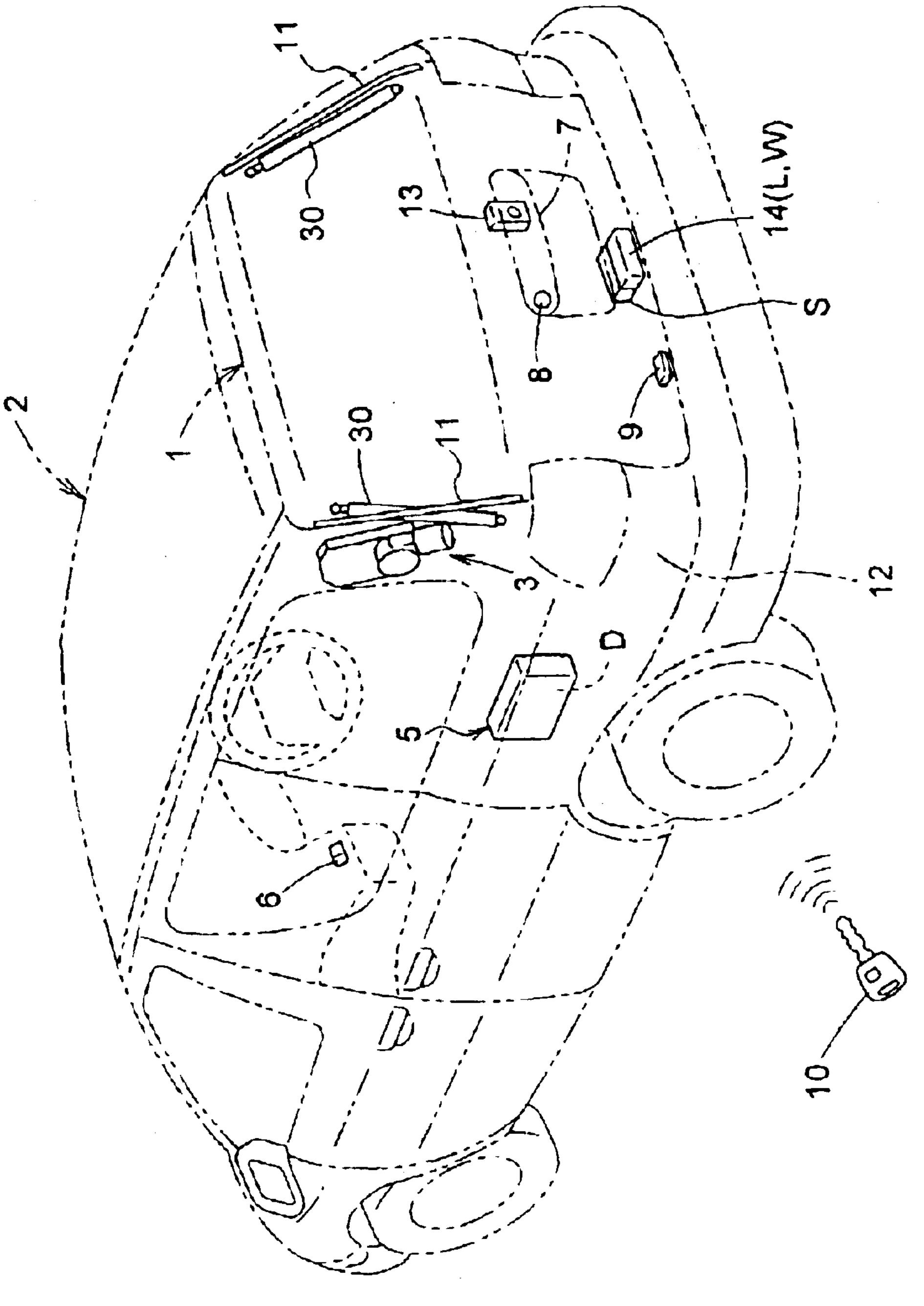
FIG. 1 is a perspective view of a vehicle back door employing a vehicle door apparatus.

The embodiments employed in a back door 1 of a vehicle are explained as follows. FIG. 1 is a perspective view showing the back door 1 of a vehicle 2, which employs the vehicle door apparatus of the present invention. Operation members provided around the back door 1 are explained referring to FIGS. 1 and 2. A drive unit 3*a* constituting a drive mechanism 3 and a rod 4 which one end is pivotally connected to an arm 3*b* are provided at a rear end portion of the vehicle 2. The back door 1 is supported by an air damper 30.

A controller 5 (control mechanism) for controlling the drive unit 3*a* is provided at the vehicle body side. In addition, a main switch 6 for switching the automatic opening and closing operation to be allowed and prohibited to start (at a predetermined timing by activating the drive mechanism) is provided adjacent to a vehicle seat. The door opening and closing operation by the drive mechanism 3 (i.e., the door is operated in a required direction of a user when the user operates the door via each switch mentioned later) is allowed when the main switch 6 is in the ON position. When the main switch 6 is in the OFF position, only a manual operation of the door is allowed.

The back door 1 can be started to operate from a closing position to an opening position by operating a handle switch 8 provided at a handle 7. In addition, the back door 1 can be started to operate from the opening position to the closing position by operating a back door switch 9 provided at a bottom portion of the back door 1.

The back door 1 can be also automatically opened or closed from outside of the vehicle via a remote control key 10. By operating the remote control key 10, the drive mechanism 3 is operated via the controller 5, thereby automatically opening or closing the back door 1.

A touch sensor 11 is provided at a predetermined portion of the back door 1 for detecting a state in which an object is trapped between the back door 1 and a vehicle body 12. When it is detected that the object is trapped between the back door 1 and the vehicle body 12, the drive mechanism 3 forcedly stops the automatic closing operation of the back door 1.

A buzzer 13 is provided close to the handle 7 of the back door 1 for raising a predetermined waning sound when the back door 1 is automatically opened or closed.

The back door 1 includes a back door closure 14 (closure mechanism) controlled by the controller 5 for ensuring the complete closing of the back door 1. In addition, a latch L for locking the back door 1 by engaging with a striker S provided at the vehicle body 12 is arranged at the bottom portion of the back door 1. The latch L is driven to shift the striker S to a final locked position for closing the back door 1 by the closure 14, which is a main function of the closure 14.

The vehicle door apparatus of the first and second embodiments each include the controller 5, the drive mechanism 3 controlled by the controller 5, the closure 14 and a switch W (detection means) turned on after detecting that the striker S is positioned within a region where the striker S is engageable with the latch L.

Figure 2:
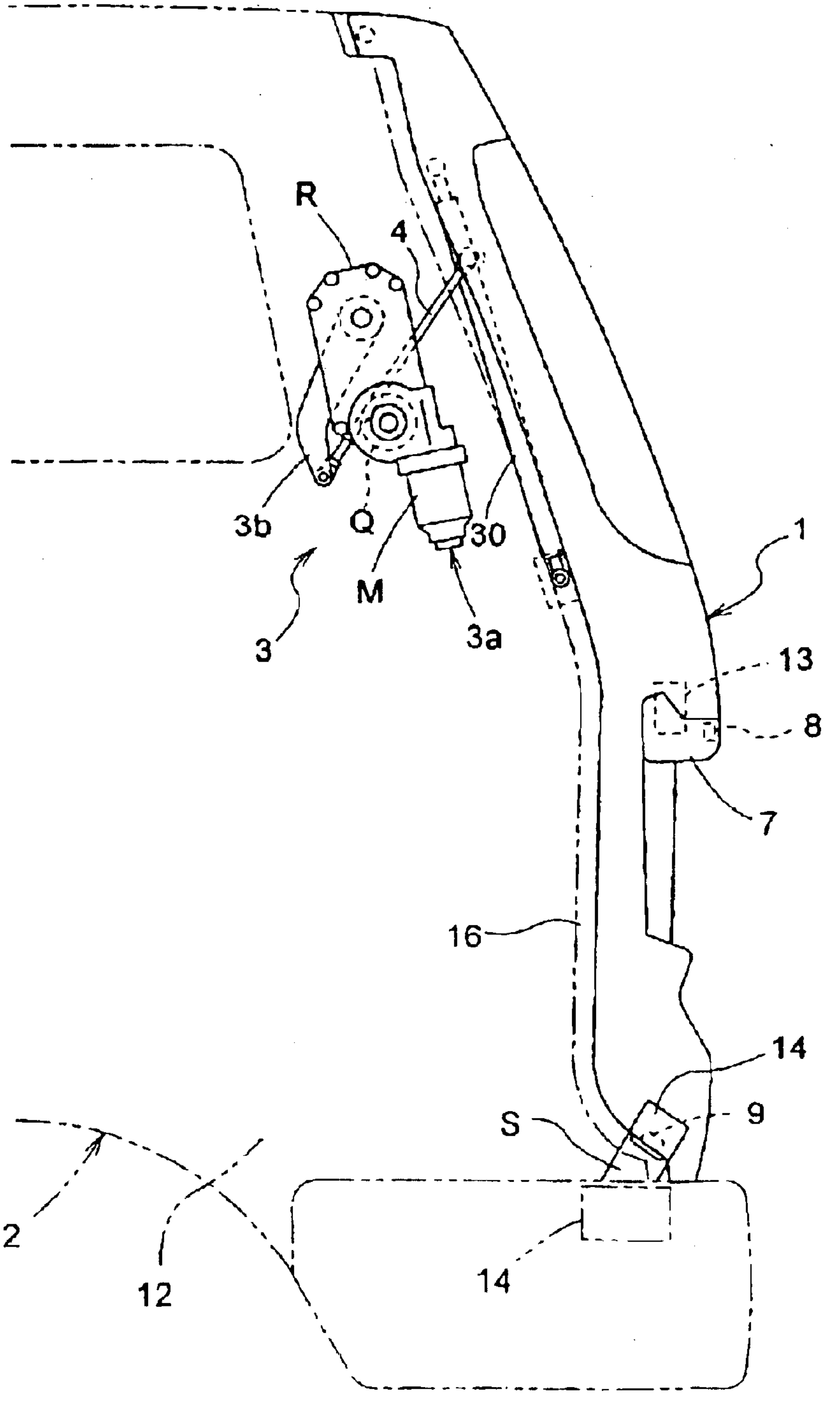
FIG. 2 is a view showing the back door in a closed state.

The structure of both embodiments is explained as follows. FIG. 2 shows the back door 1 in the closed state while FIG. 3 shows the back door 1 in the open state.

Figure 3:
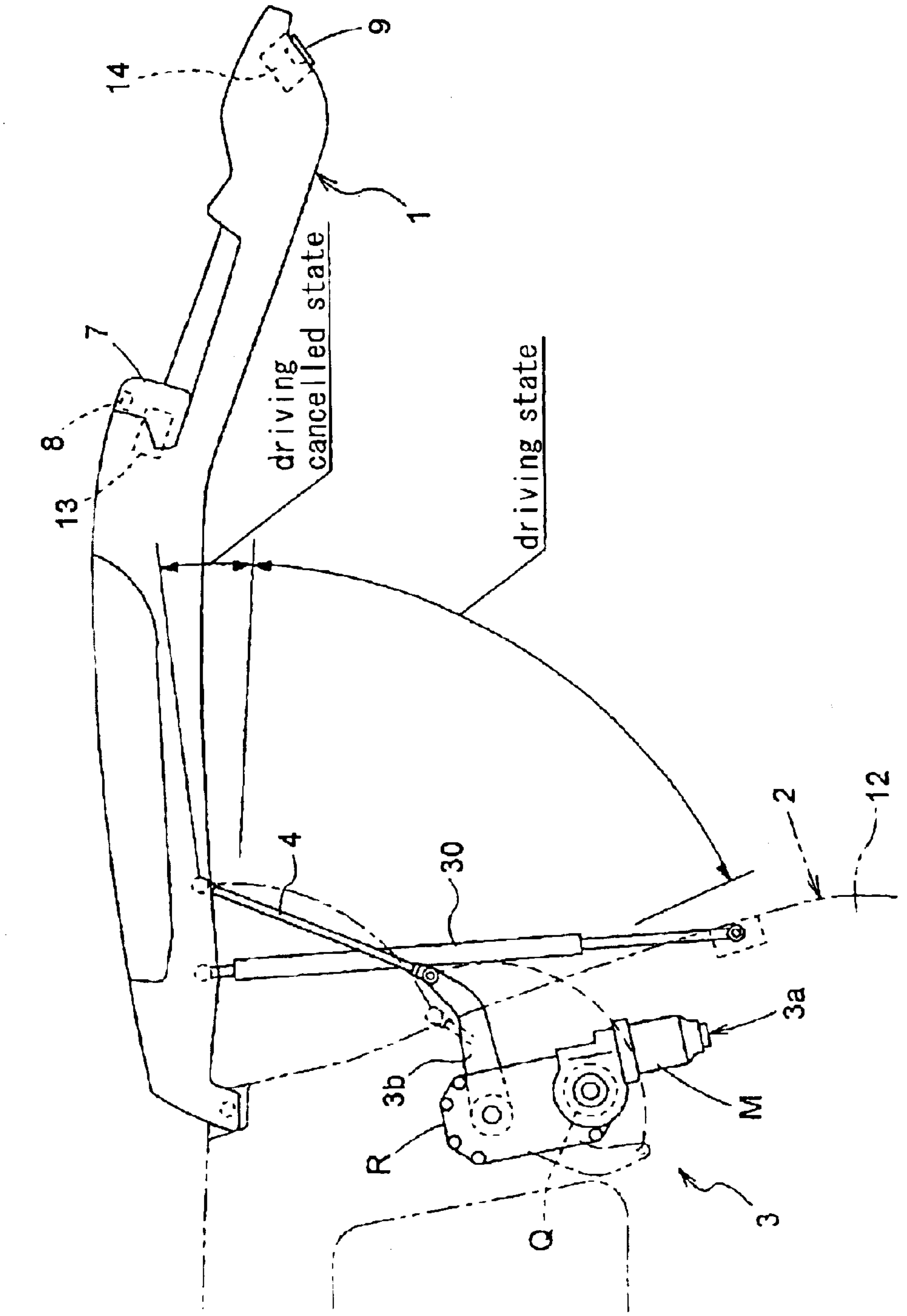
FIG. 3 is a view showing the back door in an open state.

The back door 1 is connected to the drive unit 3*a* as shown in FIGS. 2 and 3. The drive unit 3*a* includes a clutch Q provided between a driving motor M and the arm 3*b* which one end is connected to the rod 4. By engaging and disengaging the driving motor M and the rod 4 connected, to the arm 3*b* with each other, the driving state in which the arm 3*b* is driven to rotate and the driving cancelled state in which the arm 3*b* is not driven to rotate are possible.

A deceleration mechanism R is disposed together with the clutch Q between a driving motor shaft of the driving motor M and an arm shaft provided at a base side of the arm 3*b* so that the sufficient force required for swinging of the back door 1 can be obtained. The controller 5 also functions to decrease the output of the drive mechanism 3 by decreasing the output of the driving motor M by means of PWM control. A portion of the controller 5 functioning in such a manner is a drive force decreasing mechanism D.

Figure 4A:
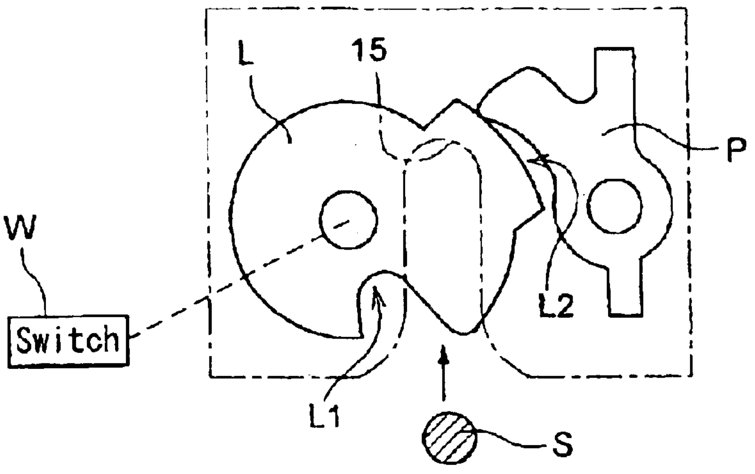
FIGS. 4A, 4B and 4C are each schematic view showing a relationship between a striker and a latch.
Figure 4B:
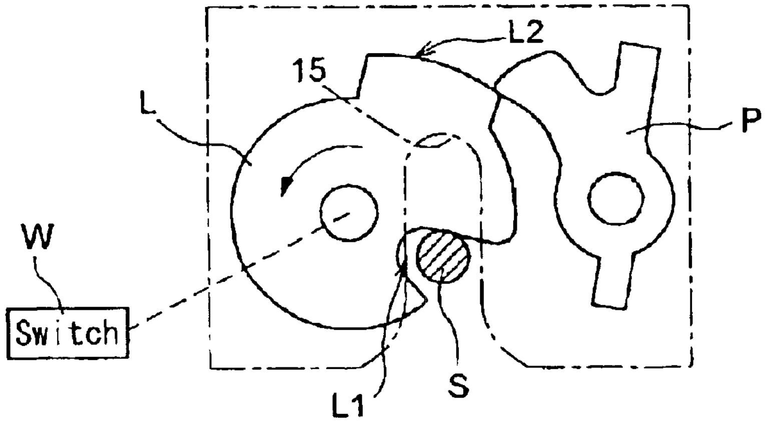
Figure 4C:
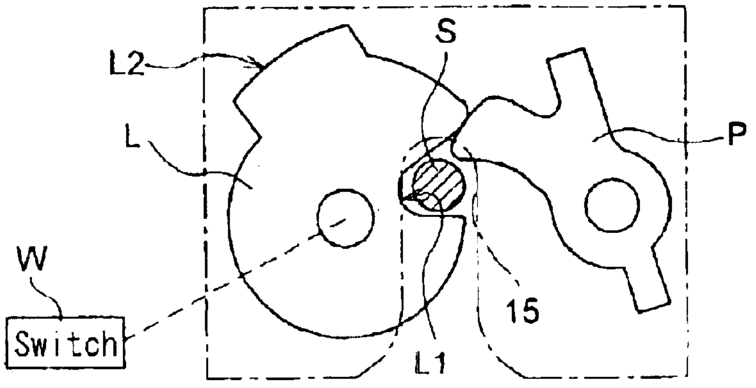

As shown in FIGS. 4A to 4C, the latch L is provided, being positioned to substantially match with a groove portion 15 provided at the bottom portion of the back door 1 and formed so as to receive the striker S. The latch L includes a concave portion L1 for receiving the striker S and is rotatably supported around a shaft provided at a substantially center portion of the latch L. When the striker S enters into the groove portion 15 due to the closing operation of the back door 1, the striker S rotates the latch L by being in contact with the concave portion L1 as shown in FIG. 4B. This state is called a temporary closed state in which the latch L is driven to rotate by the driving of the closure 14 and engages with the striker S. The latch L as well as the striker S is then shifted to the final locked position. The state in which the striker S is placed in the final locked position is shown in FIG. 4C. A pawl P for locking the door is pressed to a cam shaped portion L2 so as in contact with each other, formed at an outer periphery of the latch L. When the latch L is rotated by the striker S to the final locked position, the pawl P enters into the concave portion L1 by sliding over the cam shaped portion L2. The pawl P prevents the latch L from rotating in a reverse direction by maintaining the latch L in the final locked state as shown in FIG. 4C. The pawl P can be omitted if the other mechanism is employed to maintain the latch L in the locked state. In addition, the latch L is connected and operated with the switch W detecting the rotation position of the latch L and being turned on when the latch L is placed in the temporary closed state.

A seal member 16 is provided between the vehicle body 12 and the back door 1 for sealing the contacting portion therebetween as shown in FIG. 2. By pushing the back door 1 toward the vehicle body 12 with the force larger than an elastic deformation force of the seal member 16, the seal member 16 elastically deformed is closely in contact with the vehicle body 12 and the back door 1 by being placed therebetween.

A controlling of the controller 5 is explained as follows. The controller 5 controls the operation of the drive mechanism 3 and the back door closure 14. Signals from the main switch 6, the handle switch 8 and the back door switch 9 are input into the controller 5. When the back door switch 9 is turned on under the condition that the back door 1 is open and the main switch 6 is in the ON position, the striker S and the latch L are engaged with each other and rotated by the operation of the drive mechanism 3 so as to be placed in the temporary closed state. Then, the back door closure 14 is operated to bring the back door 1 to the final locked state. In addition, when the handle switch 8 is turned on, the drive mechanism 3 and the back door closure 14 are operated so that the back door 1 is opened to a predetermined position.

A basic control operation of the controller 5 has been explained above. The control operation of the controller 5 in detail is explained as follows under the condition that the back door 1 is operated in the closing direction according to the first embodiment of the present invention.

Figure 5:
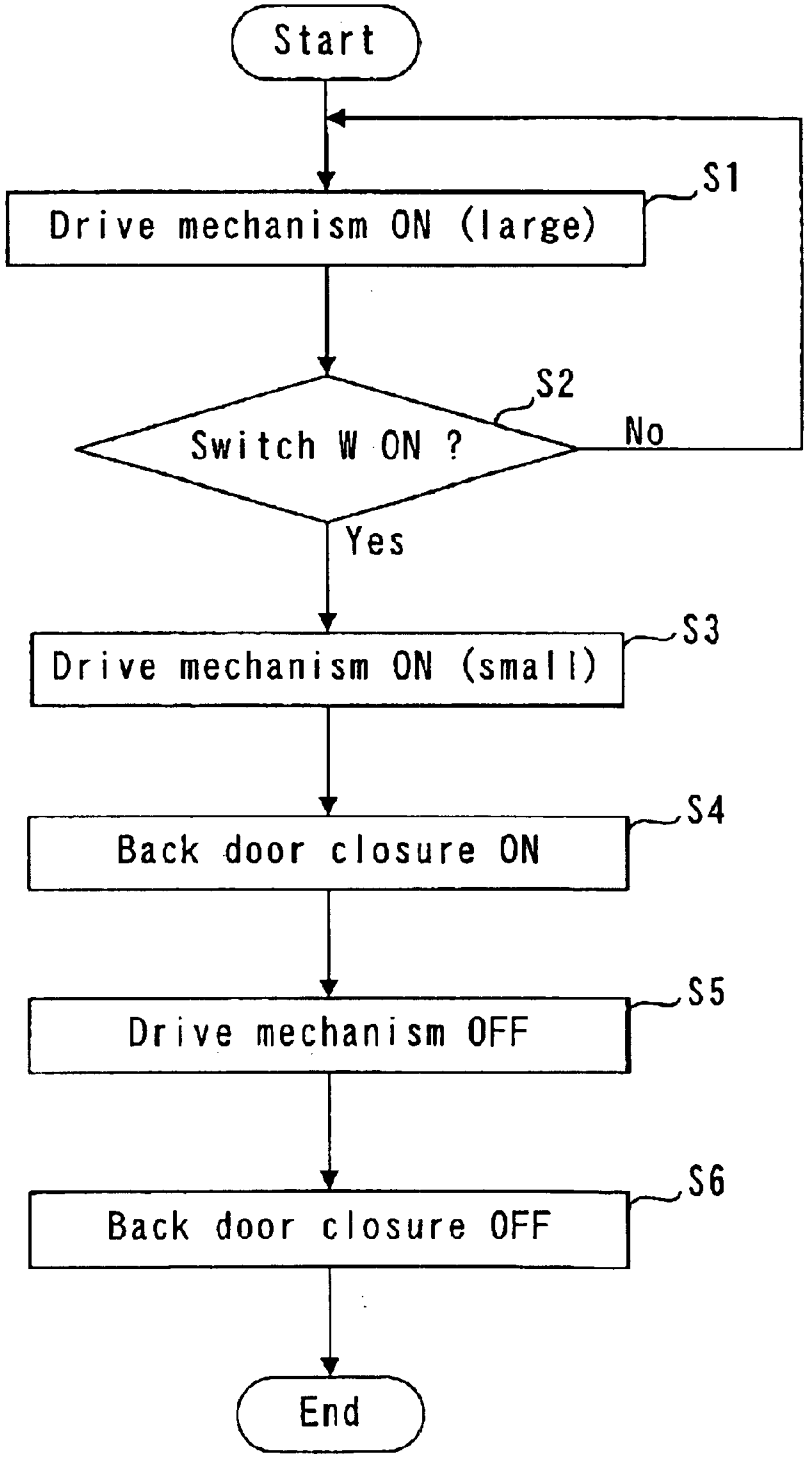
FIG. 5 is a flowchart of a door closing operation according to a first embodiment of the present invention.

FIG. 5 is a flowchart of the operation of software installed in the controller 5. The closing operation is based on the closing operation command via the back door switch 9. In Step 1, the drive mechanism 3 drives the back door 1 at a normal output value. When the back door 1 reaches the temporary closed state as closing, the switch W is turned on. That is, the drive mechanism 3 is driven at the normal output value until the switch W is turned on. In Step 2, it is determined whether the switch W is turned on or not. When the switch W is in the ON position, the output value of the drive mechanism 3 is reduced to be lower than the normal output value due to the operation of the drive force decreasing mechanism D in Step 3. Thus, the back door 1 can be maintained in the temporary closed state in which the back door closure 14 can be operated while the back door 1 is operated in the closing direction by the reduced output of the drive mechanism 3 even if the deformation of the back door 1 exists or the reaction force affects the back door 1 to operate in the opening direction due to the elastic recovery of the seal member 16. In addition, the clutch can be prevented from slipping (or reduced to slip).

In Step 4, the back door 1 can be closed in the final locked state by controlling the back door closure 14 in the ON state. Then, in Step 5 and Step 6, the drive mechanism 3 and the back door closure 14 are controlled in the OFF state respectively.

Timings of shifting from Step 2 to Step 3, Step 3 to Step 4, and Step 4 to Step 5 respectively are set, being different from each other by the controls of the pulse signal generation, a timer, and the like.

Figure 6:
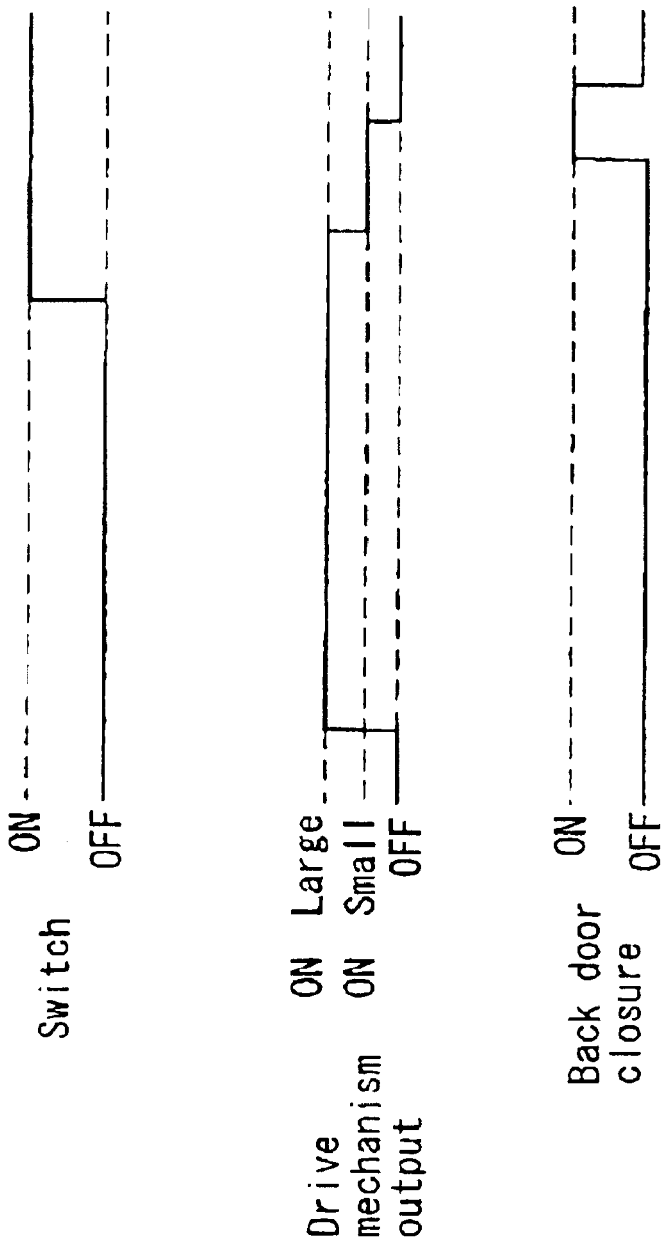
FIG. 6 is an explanatory view showing a timing of the door closing operation according to the first embodiment of the present invention.

The above-mentioned control is shown in FIG. 6 in view of the operation timing according to each mechanism. A lateral direction of a chart shows a time passage while a longitudinal direction shows the ON or OFF state of each mechanism. In the timing chart of the drive mechanism, however, the normal output state is shown as ON (large), the decreased output state is shown as ON (small), and the output stopped state is shown as OFF.

Figure 7:
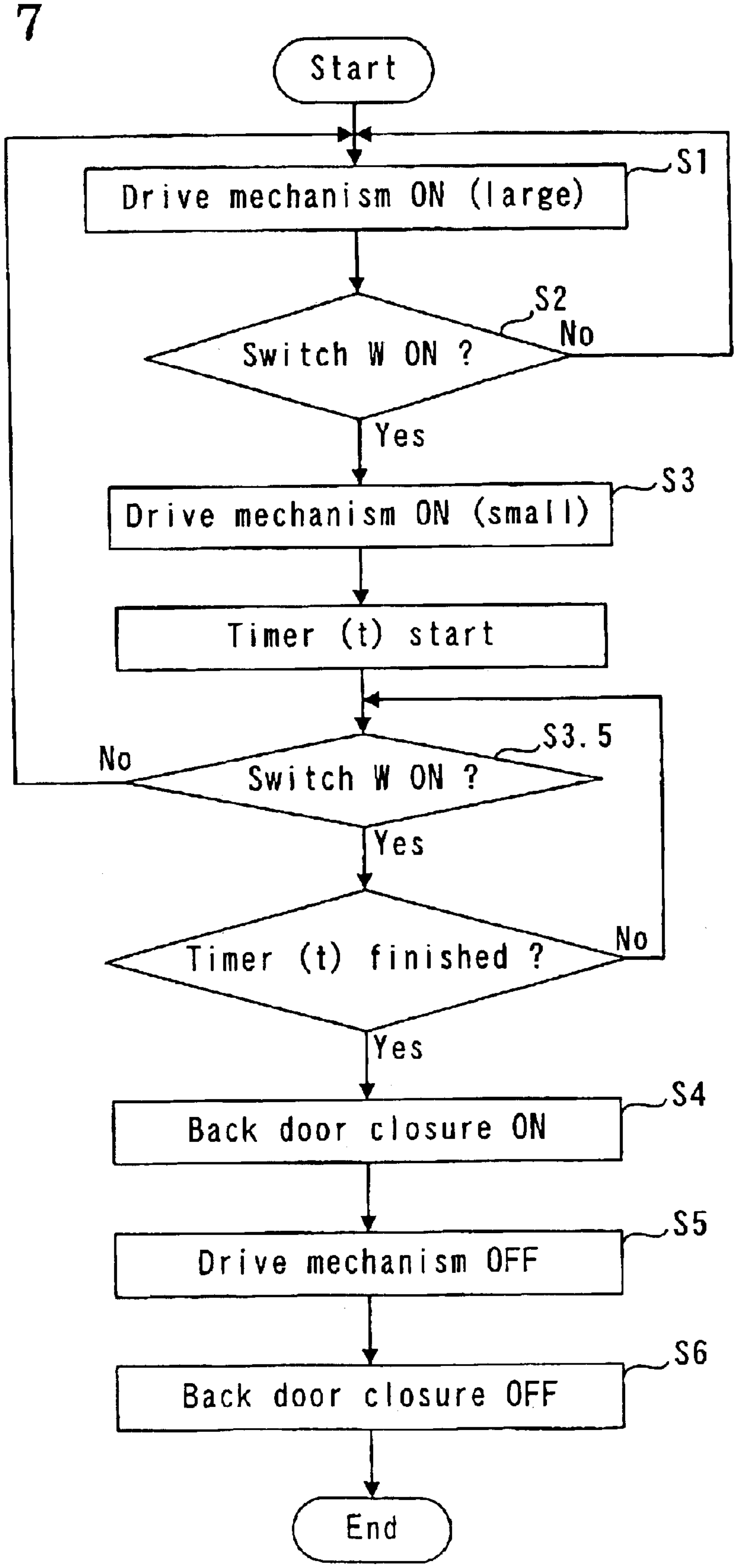
FIG. 7 is a flowchart of the door closing operation according to a second embodiment of the present invention.
Figure 8:
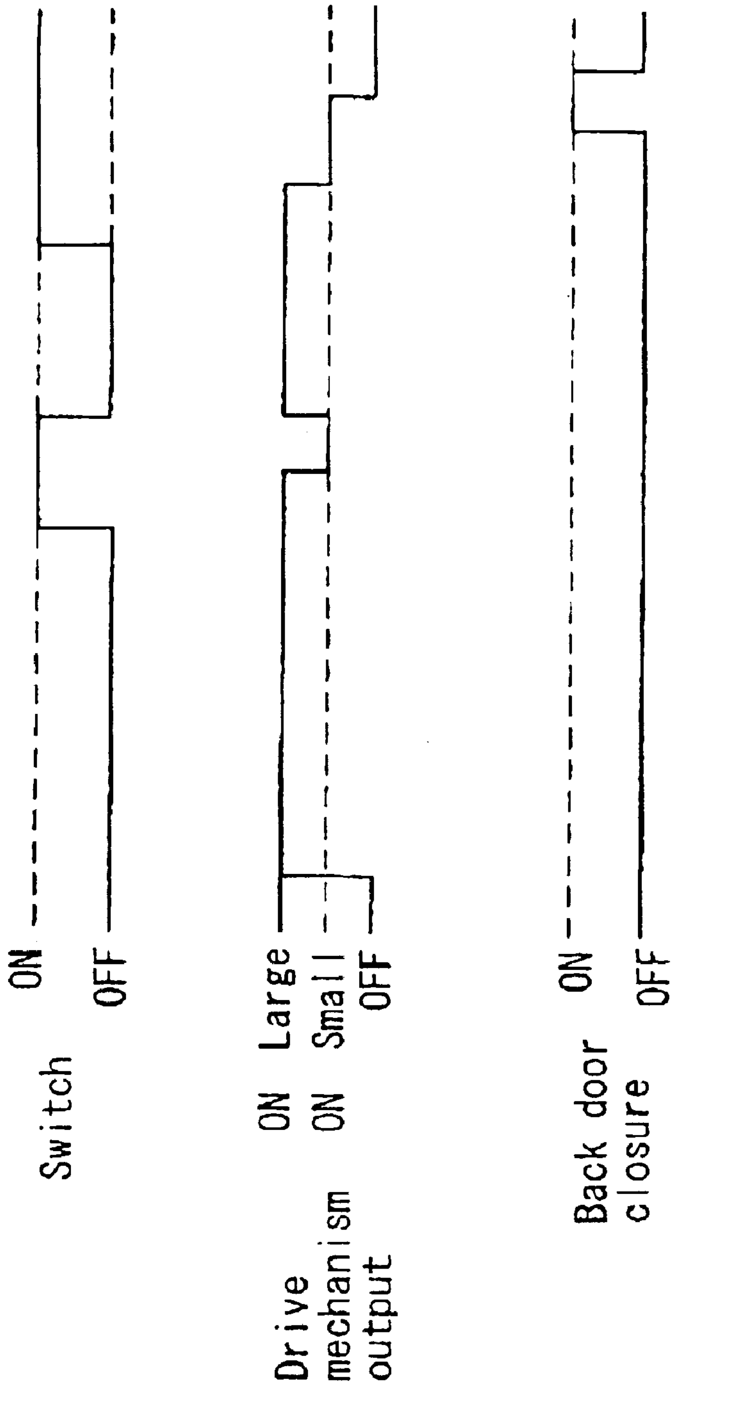
FIG. 8 is an explanatory view showing a timing of the door closing operation according to the second embodiment of the present invention.
Figure 9A:
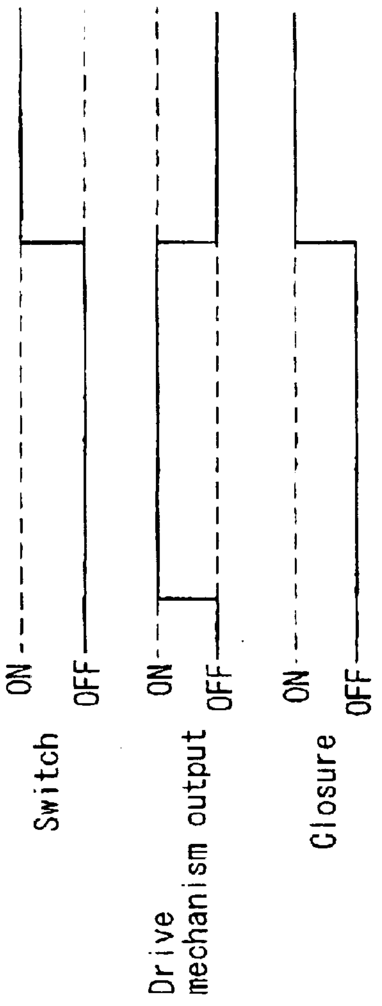
Fig. 9A Prior Art
FIGS. 9A and 9B are each explanatory view showing a timing of the door closing operation according to a conventional door apparatus.
Figure 9B:
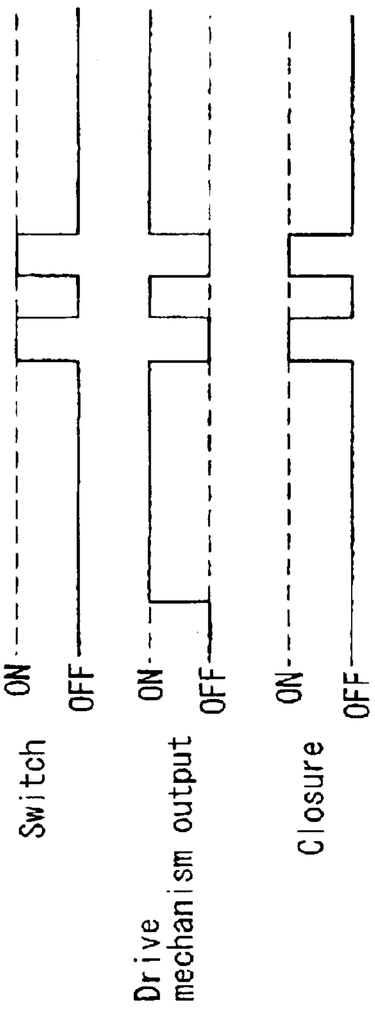
Fig. 9B Prior Art
Figure 10:
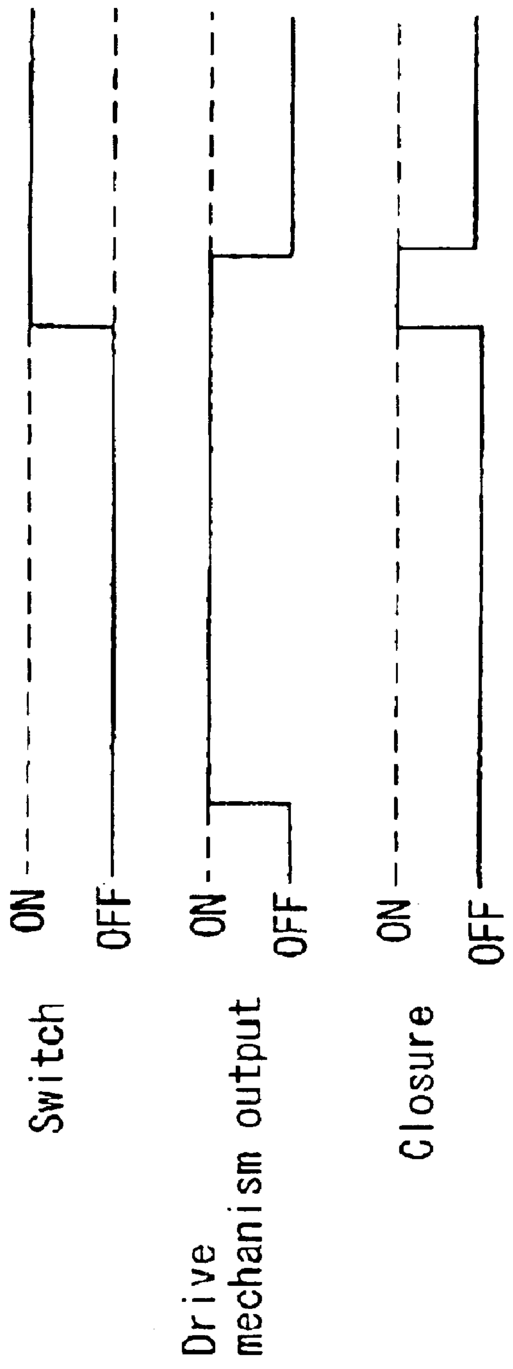
FIG. 10 is an explanatory view showing a timing of the closing operation presumed from the conventional door apparatus.

The control operation of the controller 5 according to the second embodiment of the present invention is explained referring to FIGS. 7 and 8. According to the second embodiment, the back door 1 can be effectively closed even if a force applied to the door to return in the opening direction is large. FIG. 7 shows a flowchart of the operation of software installed in the controller 5.

The controlling from Step 1 to Step 3 is same as that of the first embodiment. In case that the back door 1 is returned in the opening direction after the output of the drive mechanism 3 is decreased from the normal output, the switch W may be turned off due to the cancellation of the temporary closed state. In order to solve this problem, it is determined whether the switch W is in the ON position or the OFF position again in Step 3.5 after Step 3. Then, the process is proceeded to Step 4 in the same way as the first embodiment when the switch W is in the ON position. When the switch W is in the OFF position, the process returns to Step 1 and repeats the steps. Thus, even if the large reaction force is applied to the back door 1 to return in the opening direction, the back door 1 can be more reliably maintained in the temporary closed state in which the back door closure 14 can be operated by switching the output of the drive mechanism 3 between the normal value and the reduced value.

Timings of shifting from Step 2 to Step 3, Step 3 to Step 4, and Step 4 to Step 5 are different from each other in the same way as the first embodiment by the controls of the pulse signal generation, a timer, and the like as shown in FIG. 7. If the switch W is turned off after the output of the drive mechanism 3 is decreased but the back door closure 4 is not yet turned on, the process returns to Step 1 promptly so that the output decrease of the drive mechanism 3 is cancelled. A time t set between a state in which the output of the drive mechanism 3 is reduced and a state in which the back door closure 4 is turned on may correspond to a time required for the back door 1 to be placed in the final locked state from the temporary locked state as shown in FIG. 7.

The above-mentioned control is shown in FIG. 8 in view of the operation timing according to each mechanism. The lateral direction of a chart shows a time passage while the longitudinal direction shows the ON or OFF state of each mechanism. In the timing chart of the drive mechanism, however, the normal output state is shown as ON (large), the decreased output state is shown as ON (small), and the output stopped state is shown as OFF.

The door to which the door apparatus of the present invention is employed is not limited to the back door 1. A slide door, each door for a driver seat, a passenger seat, or a rear seat and the like are acceptable.

The striker S is provided at the vehicle body 12 while the latch L is provided at the door according to the embodiments of the present invention. However, on the contrary, the striker S can be provided at the door while the latch L can be provided at the vehicle body 12.

The drive mechanism 3 and the closure mechanism 4 are not limited to be equipped with the respective structures in the above-mentioned embodiments The drive mechanism 3 and the closure mechanism 4 can be each equipped with other known structure. In addition, the drive mechanism 3 and the closure mechanism 4 are not limited to be installed in the respective positions in the above-mentioned embodiments and can be installed in any other appropriate positions.

The detection means is not limited to the switch W that is turned on when the door is placed in the temporary closed state by detecting the rotated position of the latch L in the above-mentioned embodiments The detection means can be a pulse counter, a potentiometer, an optical sensor, a magnetic sensor and the like which can detect the position of the latch.

Timings of shifting from Step 2 to Step 3, Step 3 to Step 4, and Step 4 to Step 5 are different from each other according to the above-mentioned embodiments. However, for example, a part of or all of shiftings between the steps can occur at the same timing.

The drive force decrease can be feasible not only by the PWM control in the aforementioned embodiments but also by adjusting the output voltage, switching a gear in the deceleration mechanism or applying the brake on the drive portion.

According to the present embodiments, the drive mechanism is not stopped to operate in the temporary closed state and thus the door can be maintained in the closing direction by the reduced output of the drive mechanism. Thus, even if the reaction force is applied to the door to return in the opening direction, the temporary closed state of the door can be maintained. The drive mechanism is prevented from repeating to be turned on and off after the door is placed in the temporary closed state, thereby automatically effectively closing the door. At this time, the output of the drive mechanism is reduced from the normal output by the drive force decreasing mechanism, so that the door can be gently closed without affected by the deformation. Further, the clutch is prevented from slipping due to the output decrease of the drive mechanism, thereby preventing the occurrence of the abnormal sound, the abrasion increase, the heating in the motor and the drive circuit and the like. As a result, the durability of the device as a whole can be improved. If the output of the drive mechanism is reduced to a level at which the clutch does not slip, the slip and the adverse affect caused thereby can be not only reduced but also prevented.

According to the aforementioned embodiments, when the operation of the closure mechanism is started after the drive force decreasing mechanism is started to operate, the drive mechanism can promptly stabilize a state in which the output of the drive mechanism and the force affecting the door to return in the opening direction interact with each other, which may not be stable immediately after the detection means detects that the door is in the temporary closed state. The door is immediately brought into a state in which the door lock is available. That is, the extra time required for closing the door can be reduced, thereby closing the door more effectively. Since the closure mechanism is started to operate after the force affecting the door to return in the opening direction is overcome by the output of the drive mechanism, the striker is surely shifted to the final locked position so as to close the door.

In addition, when the operation of the closure mechanism is started while the output of the drive mechanism is being decreased by the drive force decreasing mechanism, the state in which the output of the drive mechanism and the force affecting the door to return in the opening direction interact with each other, which may not be stable immediately after the detection means detects that the door is in the temporary closed state, can be stabilized and maintained by the drive mechanism. At the same time, the closure mechanism is operated for surely locking the door. The door can be surely and promptly locked accordingly.

Further, according to the aforementioned embodiments, the operation start timing of the drive force decreasing mechanism is delayed with respect to the detection of the temporary closed state of the door by the switch. While the drive force decreasing mechanism is not started after the detection of the temporary closed state of the door by the switch, the output of the drive mechanism can be maintained at the normal value, thereby promptly restraining the door returning force with a large force and stabilizing the door swinging so that the door locked state can be promptly achieved. That is, the extra time for closing the door can be reduced and thus the door can be effectively closed.

Furthermore, according to the aforementioned embodiments, even if the temporary door closed state is cancelled, the striker and the latch can be shifted to the temporary door closed state again by returning the output of the drive mechanism from the reduced state to the normal state, thereby improving reliability of the door closing.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A vehicle door apparatus for opening and closing a vehicle door, comprising:

a drive mechanism for driving the door from an open state to a closed state;

a closure mechanism including a striker provided at the vehicle body and a latch provided at the door for engaging with the striker so as to lock the door, the striker being positioned within a region where the striker is engageable with the latch when the drive mechanism drives the door in a closing direction, the latch being driven to engage with the striker and shifted to a final locked position by the closure mechanism;

a control mechanism for controlling operations of the drive mechanism and the closure mechanism based on a door closing command;

a detection means for detecting the striker to be positioned within the region where the striker is engageable with the latch; and a drive force decreasing mechanism provided in the control mechanism for decreasing an output of the drive mechanism after the detecting means detects that the striker is positioned within the region where the striker is engageable with the latch.

2. A vehicle door apparatus according to claim 1, wherein the control mechanism controls the closure mechanism to start operating after the detection means detects the striker to be positioned within the region where the striker is engageable with the latch and the drive force decreasing mechanism is started to operate.

3. A vehicle door apparatus according to claim 1, wherein the control mechanism controls the closure mechanism to start operating while the output of the drive mechanism is being decreased by the drive force decreasing mechanism.

4. A vehicle door apparatus according to claim 1, wherein the control mechanism controls to delay an operation start timing of the drive force decreasing mechanism so that the drive force decreasing mechanism is started to operate after the detection means detects the striker to be positioned within the region where the striker is engageable with the latch.

5. A vehicle door apparatus according to claim 2, wherein the control mechanism controls to delay an operation start timing of the drive force decreasing mechanism so that the drive force decreasing mechanism is started to operate after the detection means detects the striker to be positioned within the region where the striker is engageable with the latch.

6. A vehicle door apparatus according to claim 3, wherein the control mechanism controls to delay an operation start timing of the drive force decreasing mechanism so that the drive force decreasing mechanism is started to operate after the detection means detects the striker to be positioned within the region where the striker is engageable with the latch.

7. A vehicle door apparatus according to claim 1, wherein the control mechanism controls the output of the drive mechanism to return to a normal state from a decreased state when the detection means is switched to a state in which the detection means does not detect the striker to be positioned within the region where the striker is engageable with the latch from a state in which the detection means detects the striker to be positioned within the region where the striker is engageable with the latch.

8. A vehicle door apparatus according to claim 2, wherein the control mechanism controls the output of the drive mechanism to return to a normal state from a decreased state when the detection means is switched to a state in which the detection means does not detect the striker to be positioned within the region where the striker is engageable with the latch from a state in which the detection means detects the striker to be positioned within the region where the striker is engageable with the latch.

9. A vehicle door apparatus according to claim 3, wherein the control mechanism controls the output of the drive mechanism to return to a normal state from a decreased state when the detection means is switched to a state in which the detection means does not detect the striker to be positioned within the region where the striker is engageable with the latch from a state in which the detection means detects the striker to be positioned within the region where the striker is engageable with the latch.

10. A vehicle door apparatus according to claim 4, wherein the control mechanism controls the output of the drive mechanism to return to a normal state from a decreased state when the detection means is switched to a state in which the detection means does not detect the striker to be positioned within the region where the striker is engageable with the latch from a state in which the detection means detects the striker to be positioned within the region where the striker is engageable with the latch.

11. A vehicle door apparatus according to claim 1, wherein the drive mechanism includes a drive unit including a drive motor, a clutch, and a deceleration mechanism.

12. A vehicle door apparatus according to claim 11, wherein the control mechanism includes a controller provided at the vehicle body side.

13. A vehicle door apparatus according to claim 12, wherein the detection means includes a switch.

14. A vehicle door apparatus according to claim 13, wherein the drive force decreasing mechanism decreases the output of the drive mechanism by decreasing an output of the drive motor through a PWM control.

* * * * *